(12) United States Patent
Wadsworth et al.

(10) Patent No.: US 12,346,075 B2
(45) Date of Patent: Jul. 1, 2025

(54) DEVICE FOR MITIGATION OF PERSONAL INJURIES DUE TO FALLS

(71) Applicant: LANKENAU INSTITUTE FOR MEDICAL RESEARCH, Wynnewood, PA (US)

(72) Inventors: Barbara Wadsworth, Blue Bell, PA (US); George C. Prendergast, Narberth, PA (US); Barbara Merle Gilmore, Wynnewood, PA (US); Aidan Hyde, Collingswood, NJ (US); Andrew Mazzotta, Grand Rapids, MI (US); Dylan Paproski, Littleton, CO (US); Christopher Scholl, West Chester, PA (US)

(73) Assignee: LANKENAU INSTITUTE FOR MEDICAL RESEARCH, Wynnewood, PA (US)

( * ) Notice: Subject to any disclaimer, the term of this patent is extended or adjusted under 35 U.S.C. 154(b) by 400 days.

(21) Appl. No.: 17/874,859

(22) Filed: Jul. 27, 2022

(65) Prior Publication Data
US 2022/0357710 A1    Nov. 10, 2022

Related U.S. Application Data

(63) Continuation of application No. PCT/US2021/014907, filed on Jan. 25, 2021.
(Continued)

(51) Int. Cl.
*G08B 21/02* (2006.01)
*A47K 17/02* (2006.01)
(Continued)

(52) U.S. Cl.
CPC .............. *G05B 15/02* (2013.01); *A47K 17/02* (2013.01); *G08B 21/043* (2013.01); *A61G 12/00* (2013.01); *G08B 21/0469* (2013.01)

(58) Field of Classification Search
USPC ...... 340/573.1, 573.3, 571, 572.1, 588, 632, 340/636.19, 680, 683, 686.1, 687, 691.6,
(Continued)

(56) References Cited

U.S. PATENT DOCUMENTS 6,233,761 B1    5/2001  Neff
7,548,168 B2    6/2009  Ishikawa
(Continued)

FOREIGN PATENT DOCUMENTS

CN    109008010    12/2018
JP    2004252618    9/2004

OTHER PUBLICATIONS

International Search Report dated Apr. 13, 2021, in International Application No. PCT/US21/14907.
(Continued)

*Primary Examiner* — Daniel Previl
(74) *Attorney, Agent, or Firm* — FisherBroyles LLP (57) ABSTRACT

A personal injury mitigation device for sensing a fall condition and responsively deploying a protective device in bathrooms or other elevated-risk spatial environments. A fall sensing system of the device includes a sensor and an analysis module that processes a signal from the sensor to determine whether a fall condition exists, and if so, transmits a trigger signal to a deployment system. The deployment system includes a stored energy system and an actuation system operable to release stored energy in response to receipt of the trigger signal. An impact mitigation device receives the released energy from the deployment system, which causes deployment of a protective device (such as an (Continued)

airbag) from a housing in which the protective device is stored in a compact state. In the deployed state, the protective device is operable to protect a person against injury due to impact resulting from a fall.

29 Claims, 10 Drawing Sheets

Related U.S. Application Data (60) Provisional application No. 62/966,865, filed on Jan. 28, 2020.

(51) Int. Cl.
*G05B 15/02* (2006.01)
*G08B 21/04* (2006.01)
*A61G 12/00* (2006.01)

(58) Field of Classification Search
USPC .......................................................... 340/2.31
See application file for complete search history.

(56) References Cited

U.S. PATENT DOCUMENTS

| | | | |
|---|---|---|---|
| 9,675,505 B2 * | 6/2017 | Arzanpour | A61G 5/10 |
| 9,974,345 B2 | 5/2018 | Raanan | |
| 10,149,638 B2 * | 12/2018 | Buckman | G01C 19/00 |
| 2006/0001545 A1 * | 1/2006 | Wolf | A47K 3/001 |
| | | | 340/686.1 |
| 2013/0312168 A1 | 11/2013 | Raanan | |

OTHER PUBLICATIONS

Written Opinion of the International Searching Authority dated Apr. 13, 2021, in International Application No. PCT/US21/14907.

* cited by examiner

DEVICE FOR MITIGATION OF PERSONAL INJURIES DUE TO FALLS

CROSS-REFERENCE TO RELATED APPLICATION

This application is a continuation of PCT/US21/14907, filed Jan. 25, 2021, and claims the benefit of priority, under 35 U.S.C. § 119(e), of U.S. provisional patent application No. 62/966,865, filed Jan. 28, 2020, the entire disclosure of which is hereby incorporated herein by reference.

FIELD OF THE INVENTION

The present invention relates generally to protecting persons from bodily injuries relating to falls, and more particularly, to a system, device and method for mitigating or eliminating fall-related injuries by monitoring for and sensing a fall condition, and responsively deploying a protective device suitable for providing protection in an elevated-risk spatial environment.

DISCUSSION OF RELATED ART

Falls and fall-related injuries are common. The risk of a fall resulting in personal injury is typically higher for the elderly, as may be found in nursing homes and similar care facilities. Further, the risk of a fall may be higher for the infirm and/or generally healthy persons undergoing temporary medical treatment, as may be found in hospitals, surgery centers, doctors' offices and other medical treatment facilities. Further, the risk of a serious injury resulting from a fall may be elevated in a bathroom environment, as such environments are generally compact, and generally include toilets, sinks, ceramic tile and/or other hard and/or irregular surfaces that are in close proximity to the user of the bathroom and thus likely to come in contact with the user during a fall in the bathroom, and thus likely to contribute to personal injuries in the event of a fall.

Accordingly, it is desirable to have a system for monitoring and sensing a fall condition, and for responsively deploying a protective device suitable for providing adequate protection in bathrooms or other elevated-risk spatial environments.

Further, since many bathrooms already exist that pose such risks of personal injuries, what is needed is a system for monitoring and sensing a fall condition, and for responsively deploying a protective device that can be retrofitted to existing bathrooms to make such existing bathrooms safer.

SUMMARY

The present invention provides a personal injury mitigation device for monitoring and sensing a fall condition, and for responsively deploying a protective device suitable for providing adequate protection in bathrooms or other elevated-risk spatial environments. In certain embodiments, the system is configured to be easily installed/retrofitted to existing bathrooms to make such existing bathrooms safer.

In an exemplary embodiment a personal injury mitigation device in accordance with the present invention comprises a fall sensing system, a deployment system, and an impact mitigation device. The fall sensing system comprises a sensor and an analysis module. The analysis module is configured to receive a signal from the sensor that reflects a physical state of the sensor, to process the signal to determine whether a fall condition is present, and to transmit a trigger signal if the fall condition is determined to be present. The deployment system is operatively connected to the fall sensing system to receive the trigger signal. The deployment system comprises a stored energy system and an actuation system operatively connected to said stored energy system. The actuation system is operable to initiate release of energy from the stored energy system in response to receipt of the trigger signal from the fall sensing system. The impact mitigation device is operatively connected to the deployment system to receive released energy from the deployment system. The impact mitigation device is operatively connected to the actuation system. The impact mitigation device comprises a housing and a protective device stored in the housing in a compact state, and deployable from the compact state to a deployed state upon release of released energy from the deployment system. In the deployed state, the protective device is operable to protect a person against injury due to impact resulting from a fall.

BRIEF DESCRIPTION OF THE FIGURES

An understanding of the following description will be facilitated by reference to the attached drawings, in which.

DETAILED DESCRIPTION

The present invention provides a personal injury mitigation device for monitoring and sensing a fall condition, and responsively deploying a protective device suitable for providing adequate protection in bathrooms or other elevated-risk spatial environments. Further, the present invention provides a personal injury mitigation device that can be retrofitted to existing bathrooms and easily installed by facilities management teams, e.g., in nursing home, long term care, hospital, surgery center, doctor's office and other facilities, to make such existing bathrooms safer.

Each personal injury mitigation device includes a fall-sensing system and an impact mitigation device that includes a protective device that may be selectively deployed from a compact collapsed state when the fall-sensing system senses that a person is falling and/or entering a fall state. In the exemplary embodiments of FIGS. 1A-8B, each impact mitigation device is specially-configured to be compatible with and/or easily installable in a bathroom environment. Further, each protective device of the exemplary embodiments of FIGS. 1A-8B is specially-configured to provide adequate and effective injury mitigation for items commonly found in a bathroom environment.

Figure 1A:
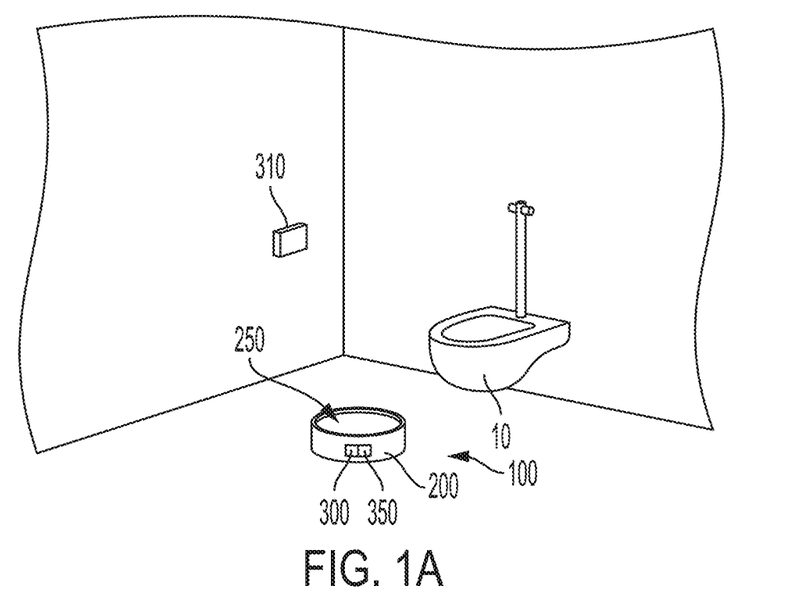
FIG. 1A is a perspective view of a first embodiment of a free-standing personal injury mitigation device in accordance with an exemplary embodiment of the present invention.

Referring now to the exemplary and illustrative non-limiting embodiments of the figures, FIG. 1A is a perspective view of a first embodiment of a free-standing personal injury mitigation device 100. In this exemplary embodiment, the device 100 includes an impact mitigation device 200 including a deployable (e.g., inflatable) protective device 250, which is shown in a compact, collapsed state in FIG. 1A, and in an expanded, deployed state, in FIG. 1B. In this embodiment, the impact mitigation device 200 is free-standing, and has a puck form-factor and may be, for example, approximately 13 inches in diameter and approximately 4 inches high. By way of example, the system 200 may include a housing in the nature of a flexible and/or frangible fabric pouch or enclosure, or a rigid frame including a fabric or other frangible portion suitable for tearing or otherwise opening to allow for deployment of the protective device. Accordingly, it is small and compact, and can be placed on the floor in front of a toilet 10, as shown in FIG. 1A. Because it is free-standing and unattached to the floor, it may be easily moved or removed to allow for cleaning of the bathroom floor, toilet, etc.

Figure 1B:
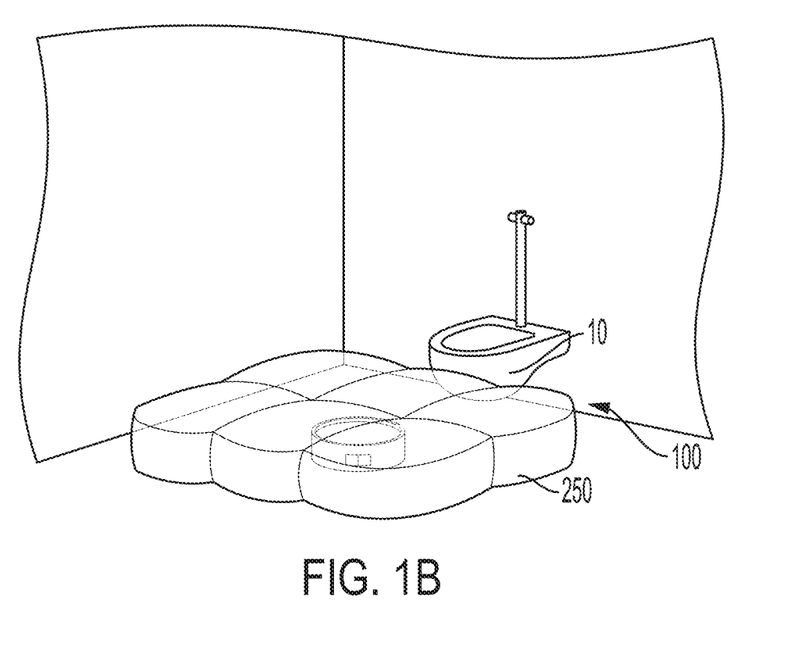
FIG. 1B is a perspective view of system of FIG. 1A, shown with the protective device in a deployed position.

The impact mitigation device 200 may be positioned in front of the toilet, and is dimensioned to have a compact puck form, e.g., housing, sufficiently narrow to allow the user of the toilet to comfortably straddle the puck in either a standing or a seated position relative to the toilet 10. In the event that the fall-sensing system 290 detects a fall condition, the fall-sensing system controls a deployment system 350 to deploy the protective device 250. The fall-sensing system 290 and deployment system 350 are discussed in greater detail below. When the deployment system 350 causes the protective device 250 to be deployed, the protective device 250 exits a compact state and enters an expanded state in which the protective device is enlarged relative to the compact state, as shown in FIG. 1B. In one embodiment, the protective device is enlarged by inflation with pressurized gas/air, so that the deployed protective device 250 acts as an airbag or inflated/pressurized cushion. When positioned or installed properly, the deployed protective device 250 will deploy predictably to be positioned at areas likely to be contacted by a falling person, and to mitigate any personal injury that might otherwise be caused by the person's impact with a bathroom surface during a fall event. In the example of FIG. 1B, the impact mitigation device 200 is properly positioned in front of the toilet 50, as shown in FIG. 1A, and is deployable to cover a larger area (e.g., from about 2 to about 1000 times greater, or any sub-range thereof, than the area of the collapsed protective device 250 or the housing of the deployment system 350) least in front of the toilet 50 that would likely be contacted by a person falling from a standing or seated position relative to the toilet 50.

Figure 2A:
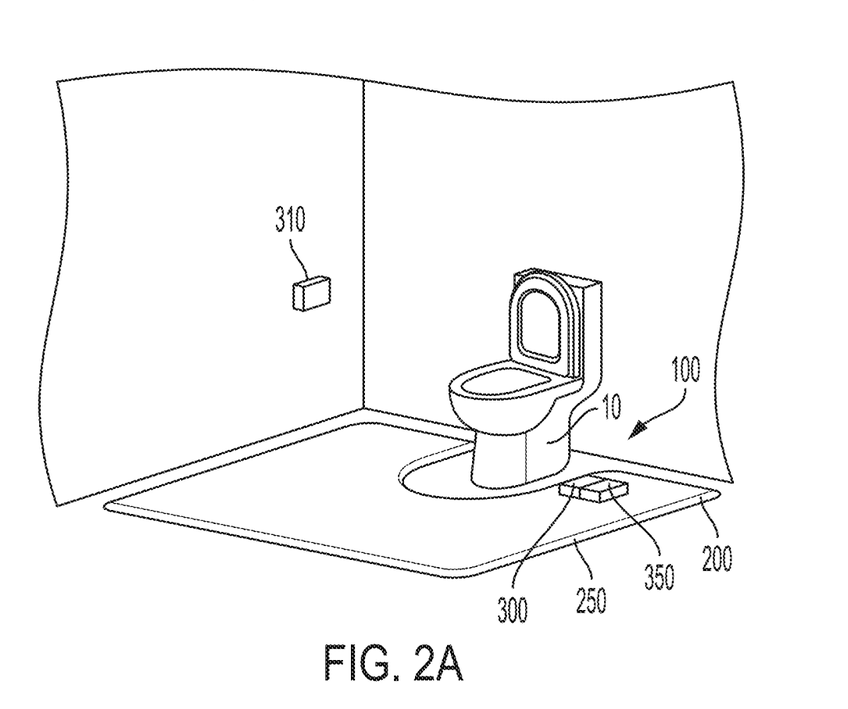
FIG. 2A is a perspective view of a second embodiment of a free-standing personal injury mitigation device in accordance with an exemplary embodiment of the present invention.
Figure 2B:
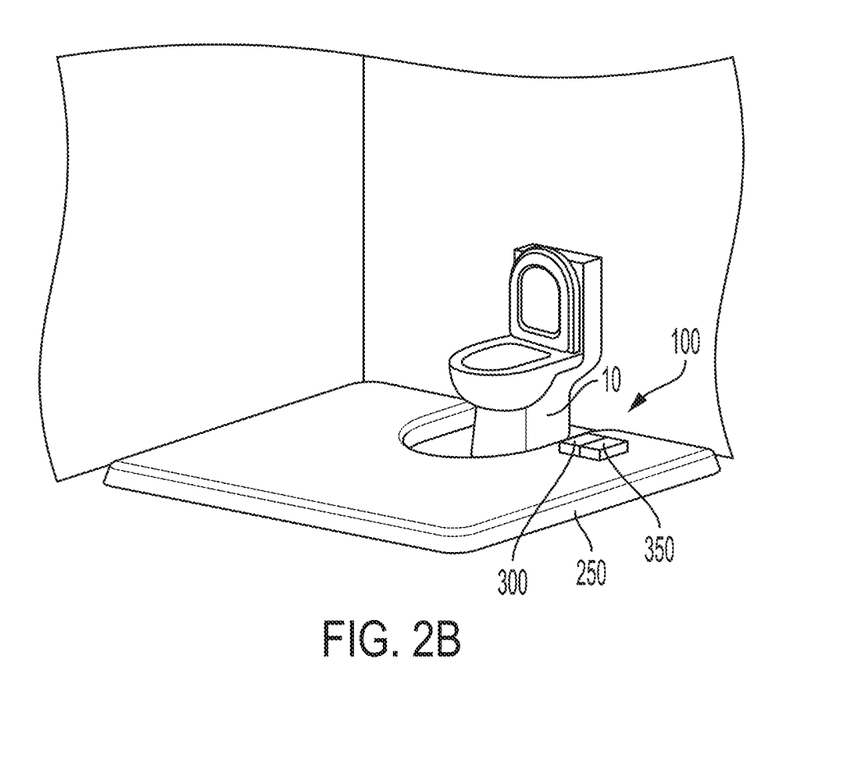
FIG. 2B is a perspective view of system of FIG. 2A, shown with the protective device in a deployed position.

FIGS. 2A and 2B are perspective views of a second embodiment of personal injury mitigation device 100. In this embodiment, the impact mitigation device 200 is free-standing, and has a floor mat form-factor, for example, rectangular and measuring approximately 18-24 inches by approximately 24-48 inches. Accordingly, it is thin in thickness (e.g., 1 inch or less), but large in area and can be placed on the floor in front of a toilet 10, as shown in FIG. 2A. In this exemplary embodiment, the impact mitigation device 200 and the protective device 250 has portions that extend not only in front of the toilet 10, but also along sides of the toilet, and is generally U-shaped, as shown in FIG. 2A. Because it is free-standing and unattached to the floor, it may be easily moved or removed to allow for cleaning of the bathroom floor, toilet, etc.

In the event that the fall-sensing system 290 detects a fall condition, the fall-sensing system controls a deployment system 350 to deploy the protective device 250. When the deployment system 350 causes the protective device 250 to be deployed, the protective device 250 exits a compact state and enters an expanded state in which the protective device is enlarged, e.g., in height and/or thickness, relative to the compact state, as shown in FIG. 2B. As described above, the protective device may be enlarged by inflation with pressurized gas/air, so that the deployed protective device 250 acts as an airbag or inflated/pressurized cushion. When positioned or installed properly, the deployed protective device 250 will deploy predictably to be positioned at areas likely to be contacted by a falling person, and to mitigate any personal injury that might otherwise be caused by the person's impact with a bathroom surface during a fall event. In the example of FIG. 2B, the impact mitigation device 200 is properly positioned along the front and sides of the toilet 50, as shown in FIG. 2B, and is deployable to cover substantially the same area as the collapsed protective device 250 or deployment system 350.

Figure 3A:
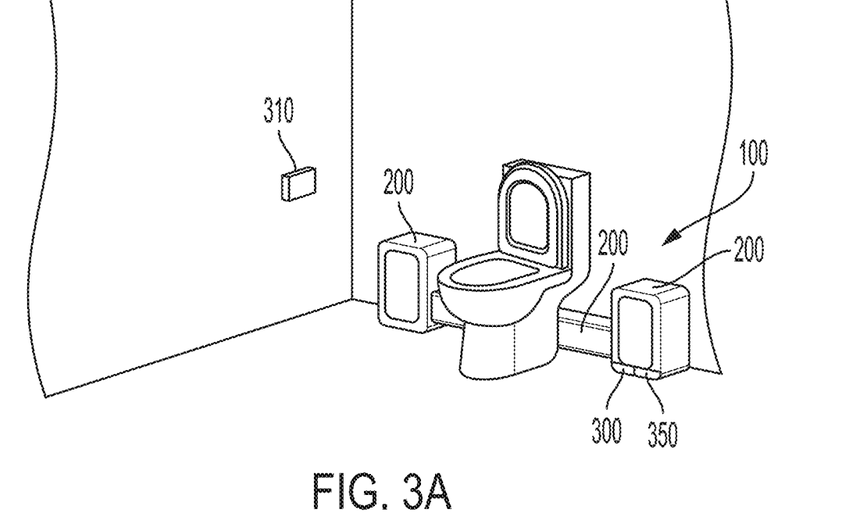
FIG. 3A is a perspective view of a third embodiment of a free-standing personal injury mitigation device in accordance with an exemplary embodiment of the present invention.
Figure 3B:
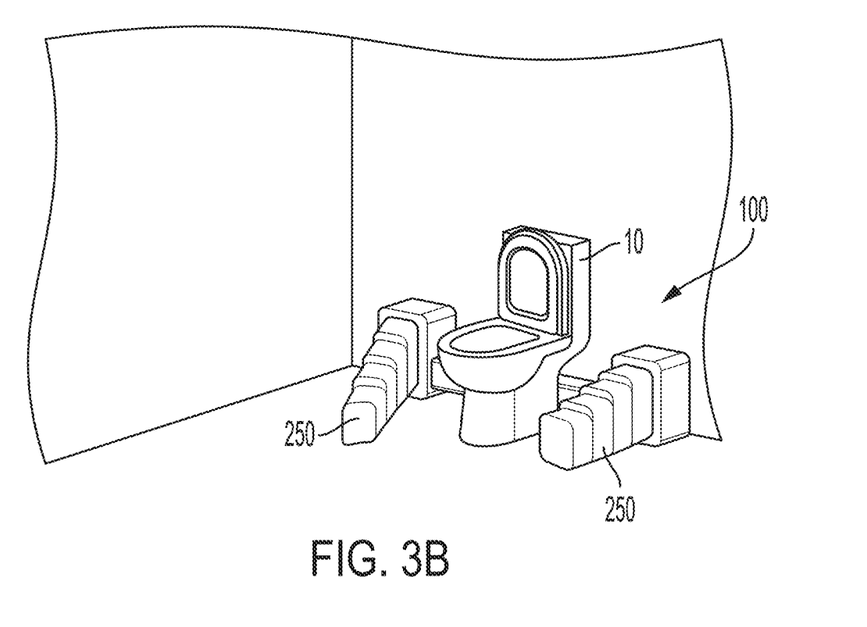
FIG. 3B is a perspective view of system of FIG. 3A, shown with the protective device in a deployed position.

FIGS. 3A and 3B are perspective views of a third embodiment of personal injury mitigation device 100. In this embodiment, the impact mitigation device 200 is free-standing, and has box form-factor (e.g., measuring approximately 12 inches×.12 inches×12 inches). It is relatively small to be placed on the floor behind a toilet 10, but elongated so that portions extend to each side of the toilet 10, as shown in FIG. 3A. In this exemplary embodiment, the impact mitigation device 200 and one or more protective device 250 have portions that extend along sides of the toilet, as shown in FIGS. 2A and 2B. Because it is free-standing and unattached to the floor, it may be easily moved or removed to allow for cleaning of the bathroom floor, toilet, etc.

In the event that the fall-sensing system 290 detects a fall condition, the fall-sensing system controls a deployment system 350 to deploy one or more protective devices 250. When the deployment system 350 causes the protective device(s) 250 to be deployed, the protective device 250 exits a compact state and enters an expanded state in which the protective device is enlarged, e.g., in height and volume, relative to the compact state, as shown in FIG. 3B. As described above, the protective device may be enlarged by inflation with pressurized gas/air, so that the deployed protective device 250 acts as an airbag or inflated/pressurized cushion. When positioned or installed properly, the deployed protective device 250 will deploy predictably to be positioned at areas likely to be contacted by a falling person, and to mitigate any personal injury that might otherwise be caused by the person's impact with a bathroom floor and wall during a fall event.

Figure 4A:
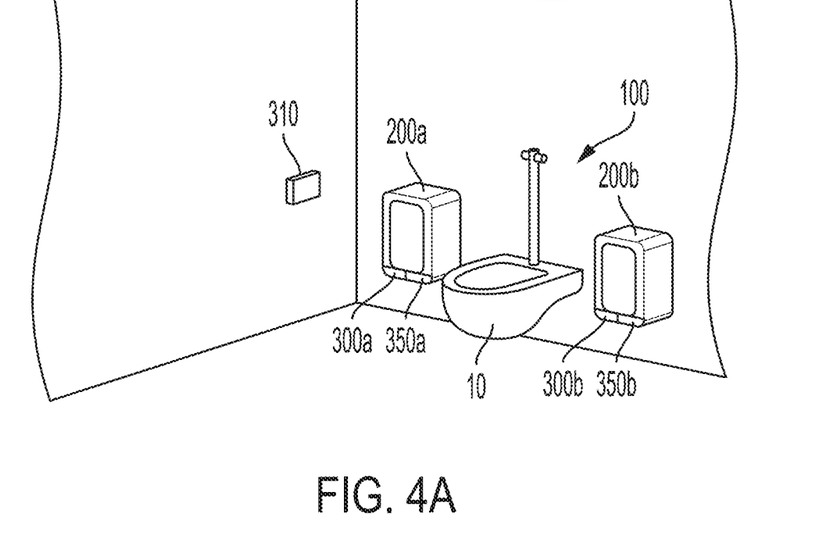
FIG. 4A is a perspective view of a first embodiment of a wall-mountable personal injury mitigation device in accordance with an exemplary embodiment of the present invention.
Figure 4B:
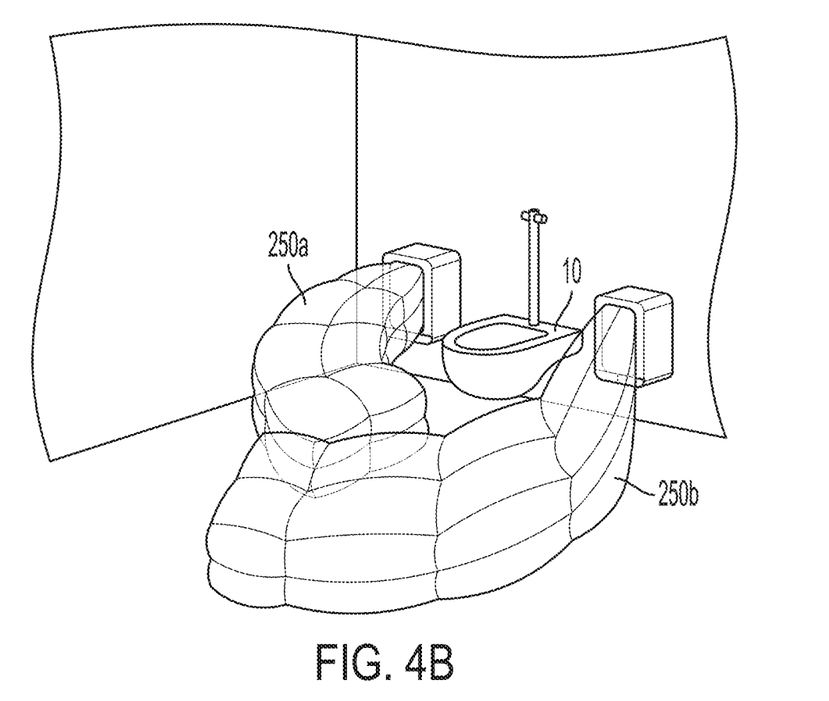
FIG. 4B is a perspective view of system of FIG. 4A, shown with the protective device in a deployed position.

FIGS. 4A and 4B are perspective views of a wall-mountable personal injury mitigation device 100. In this embodiment, the impact mitigation device 200 includes two complementary units 200a, 200b, each of which includes holes and/or a mounting bracket allowing them to be mounted to the walls of the bathroom. They are each relatively small to be mounted on the wall on each side of the toilet 10, as shown in FIG. 4A. In this exemplary embodiment, each impact mitigation device unit 200a, 200b has a respective protective device 250a, 250b having portions that extend along sides of the toilet when deployed, as shown in FIG. 4B. Further, the protective devices 250a, 250b in this exemplary embodiment are configured to be complementary to register with one another to collectively cover floor areas likely to be impacted during a fall. In this embodiment, the protective devices 250a, 250b are asymmetrical. Because the impact mitigation device units 200a, 200b are wall-mountable above and unattached to the floor, they do not interfere with cleaning of the bathroom floor, toilet, etc.

In the event that the fall-sensing system 290a, 290b detects a fall condition, the fall-sensing system controls a deployment system 350a, 350b of each unit 250a, 250b to deploy the respective protective devices 250a, 250b. When the deployment system 350a, 350b causes the protective device(s) 250a, 250b to be deployed, the protective devices 250a, 250b exit a compact state and enter an expanded state in which the protective device is enlarged, e.g., in length, width and height, relative to the compact state, as shown in FIG. 4B. As described above, the protective devices may be enlarged by inflation with pressurized gas/air, so that the deployed protective devices 250a, 250b act as airbags or inflated/pressurized cushions. When positioned or installed properly, the deployed protective devices 250a, 250b will deploy predictably to be positioned at areas likely to be contacted by a falling person, and to mitigate any personal injury that might otherwise be caused by the person's impact with a bathroom floor during a fall event.

Figure 5A:
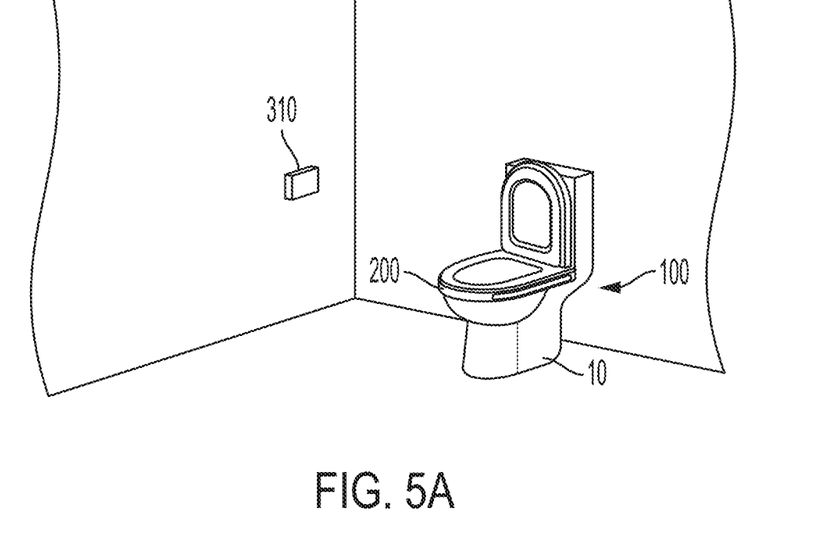
FIG. 5A is a perspective view of a first embodiment of a toilet-mountable personal injury mitigation device in accordance with an exemplary embodiment of the present invention.
Figure 5B:
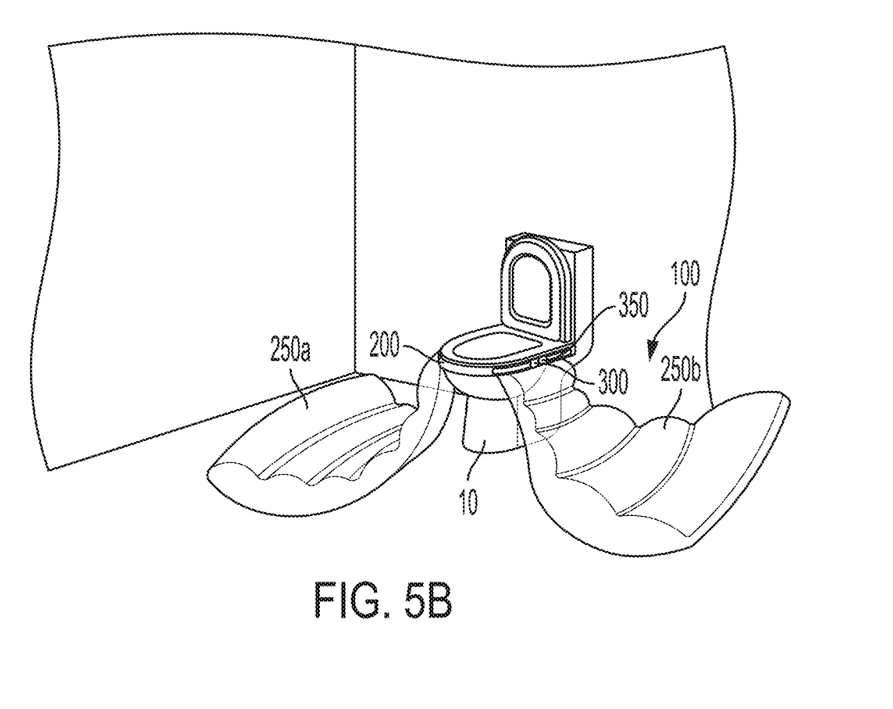
FIG. 5B is a perspective view of system of FIG. 5A, shown with the protective device in a deployed position.

FIGS. 5A and 5B are perspective views of a toilet-mountable personal injury mitigation device 100. In this embodiment, the impact mitigation device 200 is specially-configured in shape to mount to a base portion of a toilet, as shown in FIG. 5A. By way of example, the impact mitigation device may have brackets for hanging from a rim of the base of the toilet, beneath the lowered toilet seat. By way of alternative example, the system 200, may be configured to rest atop the base portion of the toilet, and to have a flange and mounting holes that can be used to mount the system 200 to the toilet to the same holes typically used to mount the toilet, and the system 200 may further include upper flanges/holes for mounting the toilet seat in a similar fashion to the system 200. This embodiment has the added advantage of raising the overall height of the toilet seat, which can be advantageous for the elderly or those recovering from injuries or surgery, as it may decrease the required degree of bending at the knee. In this exemplary embodiment, the impact mitigation device 200 has a plurality of protective devices 250a, 250b having portions that extend along the sides and/or front of the toilet when deployed, as shown in FIG. 5B. Because the impact mitigation device 200 is toilet wall-mountable above and unattached to the floor, it does not interfere with cleaning of the bathroom floor.

In the event that the fall-sensing system 290a, 290b detects a fall condition, the fall-sensing system controls a deployment system 350a, 350b of each unit 250a, 250b to deploy the respective protective devices 250a, 250b. When the deployment system 350a, 350b causes the protective device(s) 250a, 250b to be deployed, the protective devices 250a, 250b exit a compact state and enter an expanded state in which the protective device is enlarged, e.g., in length, width and height, relative to the compact state, as shown in FIG. 4B. As described above, the protective devices may be enlarged by inflation with pressurized gas/air, so that the deployed protective devices 250a, 250b act as airbags or inflated/pressurized cushions. These protective devices may be constructed similarly to automotive supplemental restraint system airbags, and thus may be made, for example, of thin, nylon fabric. When positioned or installed properly, the deployed protective devices 250a, 250b will deploy predictably to be positioned at areas likely to be contacted by a falling person, and to mitigate any personal injury that might otherwise be caused by the person's impact with a bathroom floor during a fall event.

Figure 6A:
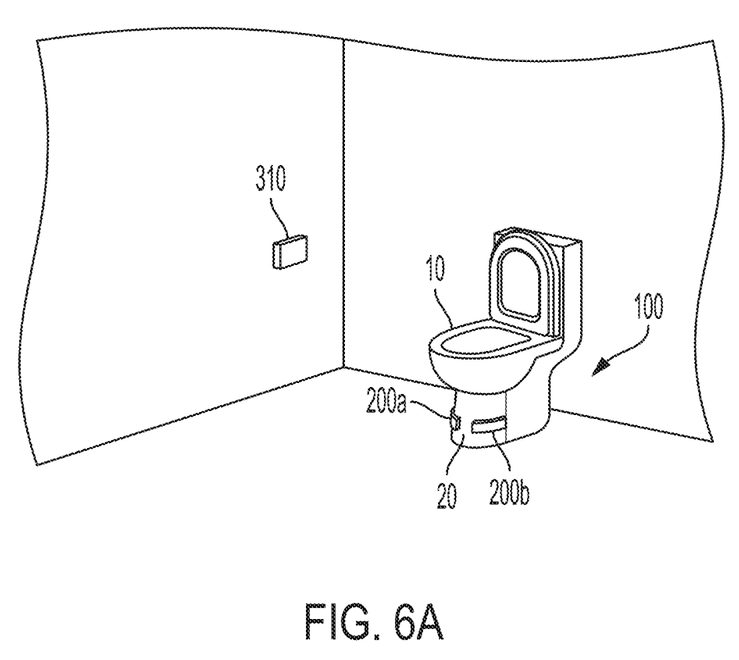
FIG. 6A is a perspective view of a second embodiment of a toilet-mountable personal injury mitigation device in accordance with an exemplary embodiment of the present invention.
Figure 6B:
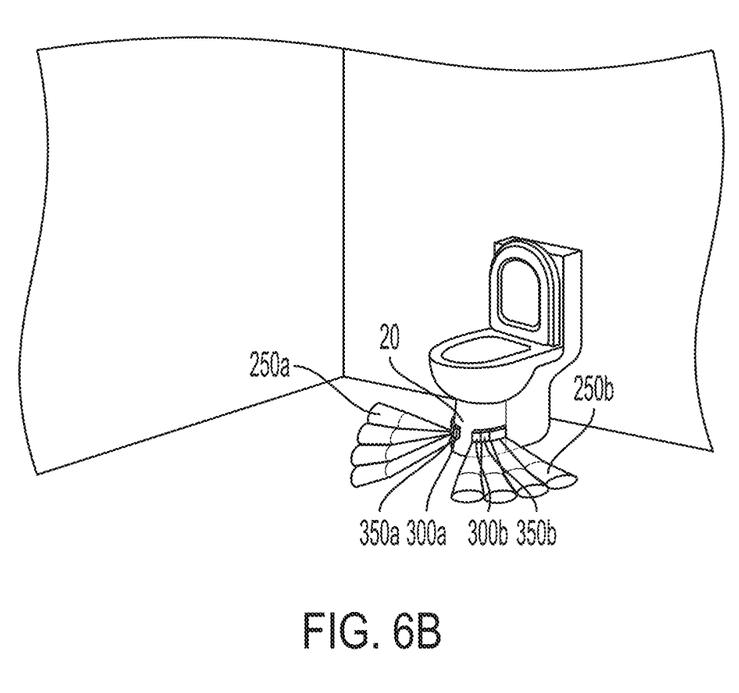
FIG. 6B is a perspective view of system of FIG. 6A, shown with the protective device in a deployed position.

FIGS. 6A and 6B are perspective views of another toilet-mountable personal injury mitigation device 100. In this embodiment, the impact mitigation device 200 includes two complementary units 200a, 200b, each of which is specially-shaped and sized to be mounted on the base portion 20 of the toilet 10, as shown in FIG. 6A. The units each have a rear surface complementary to a surface of the base of the toilet, and provided with adhesive for mounting the unit to the surface. In this exemplary embodiment, each impact mitigation device unit 200a, 200b has a respective protective device 250a, 250b having portions that extend along sides of the toilet when deployed, as shown in FIG. 6B. Because the impact mitigation device units 200a, 200b are toilet-mountable above and unattached to the floor, and below the rim of the toilet, they do not substantially interfere with cleaning of the bathroom floor, toilet, etc.

In the event that the fall-sensing system 290a, 290b detects a fall condition, the fall-sensing system controls a deployment system 350a, 350b of each unit 250a, 250b to deploy the respective protective devices 250a, 250b. When the deployment system 350a, 350b causes the protective device(s) 250a, 250b to be deployed, the protective devices 250a, 250b exit a compact state and enter an expanded state in which the protective device is enlarged, e.g., in length, width and height, relative to the compact state, as shown in FIG. 6B. As described above, the protective devices may be enlarged by inflation with pressurized gas/air, so that the deployed protective devices 250a, 250b act as airbags or inflated/pressurized cushions. When positioned or installed properly, the deployed protective devices 250a, 250b will deploy predictably to be positioned at areas likely to be contacted by a falling person, and to mitigate any personal injury that might otherwise be caused by the person's impact with a bathroom floor during a fall event.

Figure 7A:
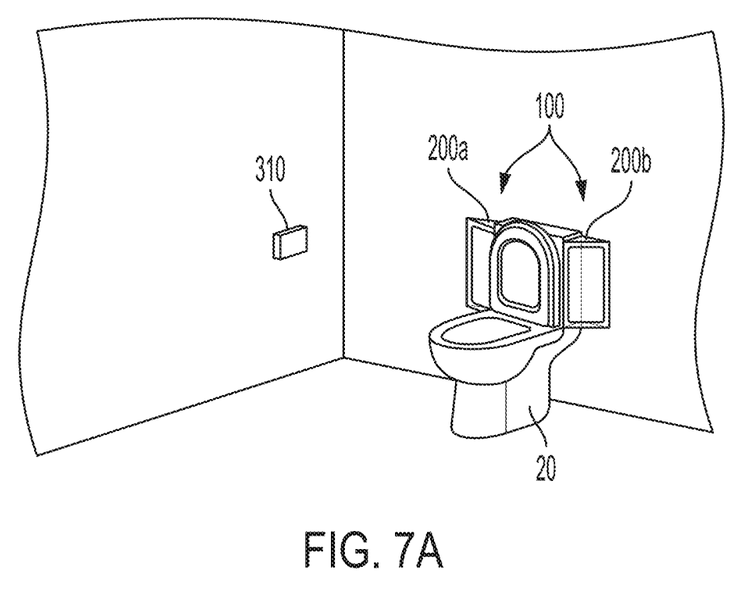
FIG. 7A is a perspective view of a third embodiment of a toilet-mountable personal injury mitigation device in accordance with an exemplary embodiment of the present invention.
Figure 7B:
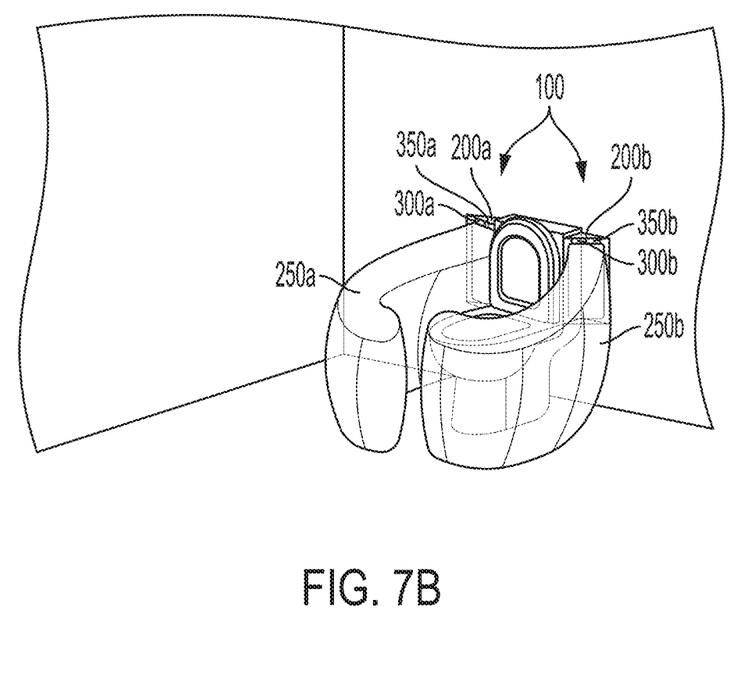
FIG. 7B is a perspective view of system of FIG. 7A, shown with the protective device in a deployed position.

FIGS. 7A and 7B are perspective views of a wall-mountable personal injury mitigation device 100. In this embodiment, the impact mitigation device 200 includes two complementary units 200a, 200b, each of which includes a mounting bracket allowing them to be mounted to a tank portion of the toilet 10, e.g. using hangers and/or mounting brackets, as shown in FIG. 7A. In this exemplary embodiment, each impact mitigation device unit 200a, 200b has a respective protective device 250a, 250b having portions that extend along sides of the toilet when deployed, as shown in FIG. 7B. Further, the protective devices 250a, 250b in this exemplary embodiment are configured to be complementary to be complementary to one another to collectively encircle the toilet and cover floor areas likely to be impacted during a fall. Because the impact mitigation device units 200a, 200b are toilet-mountable above and unattached to the floor, they do not interfere with cleaning of the bathroom floor, base of the toilet, etc.

In the event that the fall-sensing system 290a, 290b detects a fall condition, the fall-sensing system controls a deployment system 350a, 350b of each unit 250a, 250b to deploy the respective protective devices 250a, 250b. When the deployment system 350a, 350b causes the protective device(s) 250a, 250b to be deployed, the protective devices 250a, 250b exit a compact state and enter an expanded state in which the protective device is enlarged, e.g., in length, width and height, relative to the compact state, as shown in FIG. 7B. As described above, the protective devices may be enlarged by inflation with pressurized gas/air, so that the deployed protective devices 250a, 250b act as airbags or inflated/pressurized cushions. When positioned or installed properly, the deployed protective devices 250a, 250b will deploy predictably to be positioned at areas likely to be contacted by a falling person, and to mitigate any personal injury that might otherwise be caused by the person's impact with a bathroom floor during a fall event.

Figure 8A:
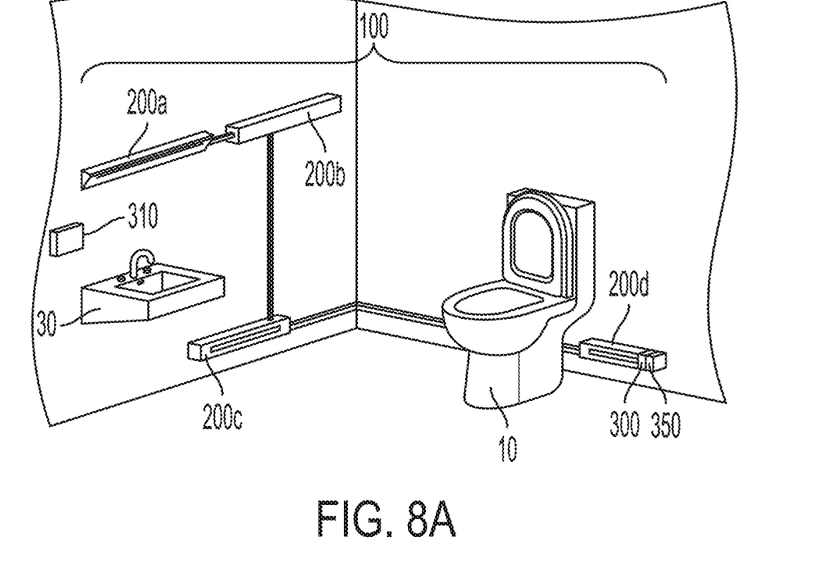
FIG. 8A is a perspective view of a second embodiment of a wall-mountable personal injury mitigation device in accordance with an exemplary embodiment of the present invention.
Figure 8B:
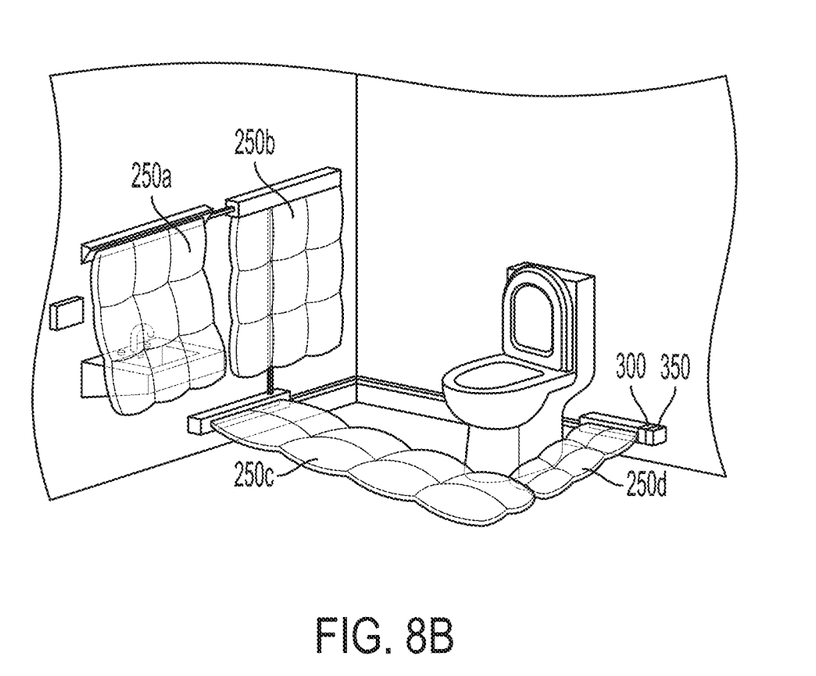
FIG. 8B is a perspective view of system of FIG. 8A, shown with the protective device in a deployed position.

FIGS. 8A and 8B are perspective views of a wall-mountable personal injury mitigation device 100 comprising an impact mitigation device 200 comprising an array of complementary units 200a, 200b, 200c, 200d, each of which includes a mounting bracket allowing them to be mounted to the walls of the bathroom. These units may be provided as independent modular units that may be grouped together as needed to provide desired protection for any particular bathroom or other environment. They are each relatively small to be mounted on the wall above the sink 30 and adjacent the toilet 10, as shown in FIG. 8A. In this exemplary embodiment, each impact mitigation device unit 200a, 200b, 200c, 200d has a respective protective device 250a, 250b, 250c, 250d intended to cover portions of the sink, wall and/or floor of the bathroom when deployed, as shown in FIG. 8B. Because the impact mitigation device units 200a, 200b, 200c, 200d are wall-mountable above and unattached to the floor, they do not interfere with cleaning of the bathroom floor, toilet, etc. Optionally, each unit includes its own respective deployment system, contributing to the modularity of the system. The units may be interconnected to communicate/share/repeat trigger signals for initiating protective device deployment, as needed. In alternative embodiments, one or more units may share a common deployment system, and the devices may be interconnected for communication of pressurized gas, etc. for deployment of protective devices at more than one unit.

In the event that the fall-sensing system 290 detects a fall condition, the fall-sensing system controls a deployment system 350 that causes each unit 200a, 200b, 200c, 200d to deploy the respective protective devices 250a, 250b, 250c, 250d. When the deployment system 350 causes the protective devices 250a, 250b, 250c, 250d to be deployed, the protective devices 250a, 250b, 250c, 250d exit a compact state and enter an expanded state in which the protective device is enlarged, e.g., in length, width and height, relative to the compact state, as shown in FIG. 8B. As described above, the protective devices may be enlarged by inflation with pressurized gas/air, so that the deployed protective devices 250a, 250b, 250c, 250d act as airbags or inflated/pressurized cushions. When positioned or installed properly, the deployed protective devices 250a, 250b, 250c, 250d will deploy predictably to be positioned at areas likely to be contacted by a falling person, and to mitigate any personal injury that might otherwise be caused by the person's impact with a bathroom floor during a fall event.

Figure 9A:
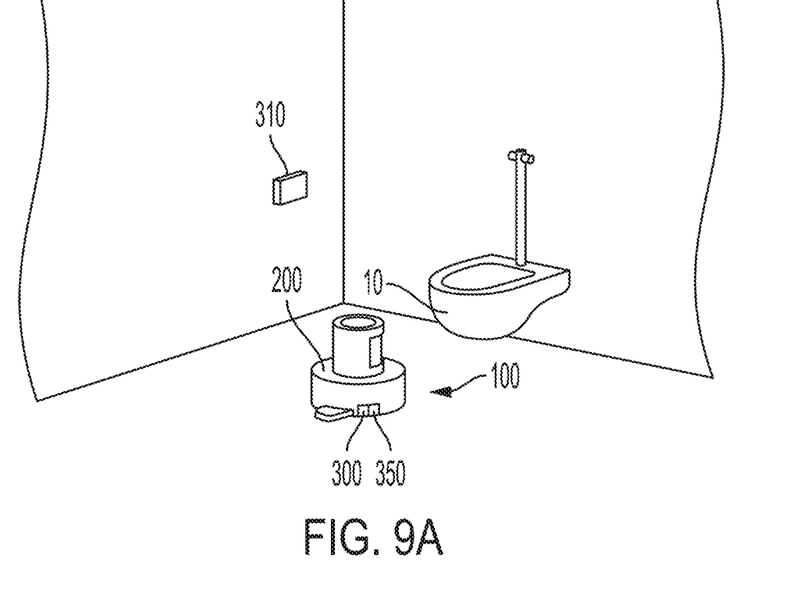
FIG. 9A is a perspective view of a third embodiment of a free-standing personal injury mitigation device in accordance with an exemplary embodiment of the present invention.
Figure 9B:
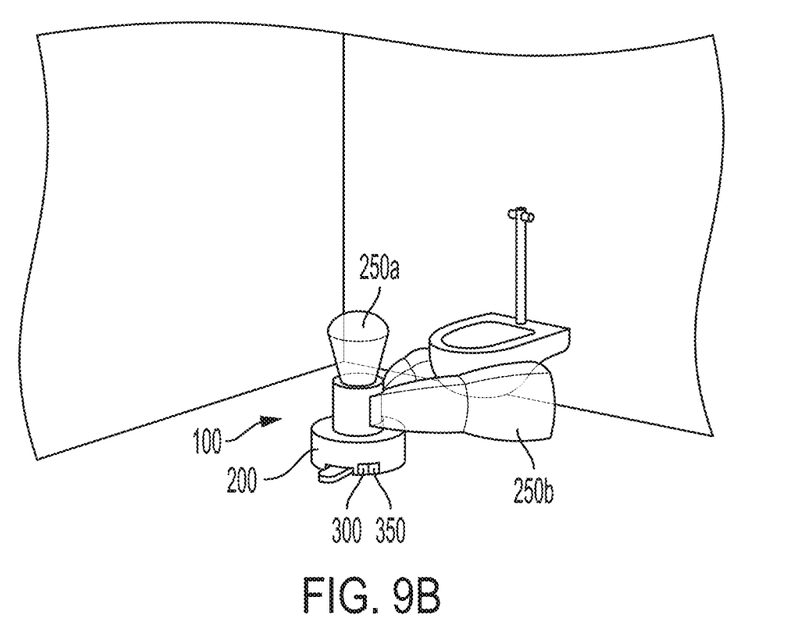
FIG. 9B is a perspective view of system of FIG. 9A, shown with the protective device in a deployed position.

FIGS. 9A and 9B are perspective views of a free-standing personal injury mitigation device 100 comprising an impact mitigation device 200. In this exemplary embodiment, the device 100 includes an impact mitigation device 200 including a deployable (e.g., inflatable) protective device 250, which is shown in a collapsed state in FIG. 1A, and in an expanded, deployed state, in FIG. 1B. In this embodiment, the impact mitigation device 200 is free-standing, and is supported on a wheeled base, so that the impact mitigation device 200 can be moved into a desired position and/or be moved from one bathroom or bedroom to the next on an as-needed basis. The impact mitigation device 200 includes a foot-operable pedal operable to adjust the base from a first position in which the wheels may move freely to reposition to unit, so a second position in which the wheels are locked and/or do not engage the floor, to stabilize the base in a desired location within a room. For example, the pedal may be operable to raise and lower the wheels relative to the floor and/or ground-engaging pads on the base. By way of example, the system 200 may include a housing in the nature of a flexible and frangible fabric pouch or enclosure, or a rigid frame including a fabric or other frangible portion suitable for tearing or otherwise opening to allow for deployment of the protective device. Accordingly, it is small and compact, and can be rolled on the floor to a position in front of a toilet 10, as shown in FIG. 9A. Because it is free-standing and unattached to the floor, it may be easily moved or removed to allow for cleaning of the bathroom floor, toilet, etc. This impact mitigation device 200 has both upper and lower protective devices 250a, 250b. The upper device is deployable to protect the user from an impact with the unit itself. The lower device is deployable to span the front and side regions adjacent a toilet, to protect the user from an impact with portions of the floor adjacent the toilet.

In the event that the fall-sensing system 290 detects a fall condition, the fall-sensing system controls a deployment system 350 that causes the impact protection system 200 to deploy the respective protective devices 250a, 250b. When the deployment system 350 causes the protective devices 250a, 250b to be deployed, the protective devices 250a, 250b exit a compact state and enter an expanded state in which the protective device is enlarged, e.g., in length, width and height, relative to the compact state, as shown in FIG. 9B. As described above, the protective devices may be enlarged by inflation with pressurized gas/air, so that the deployed protective devices 250a, 250b act as airbags or inflated/pressurized cushions. When positioned or installed properly, the deployed protective devices 250a, 250b will deploy predictably to be positioned at areas likely to be contacted by a falling person, and to mitigate any personal injury that might otherwise be caused by the person's impact with a bathroom floor during a fall event.

Figure 10:
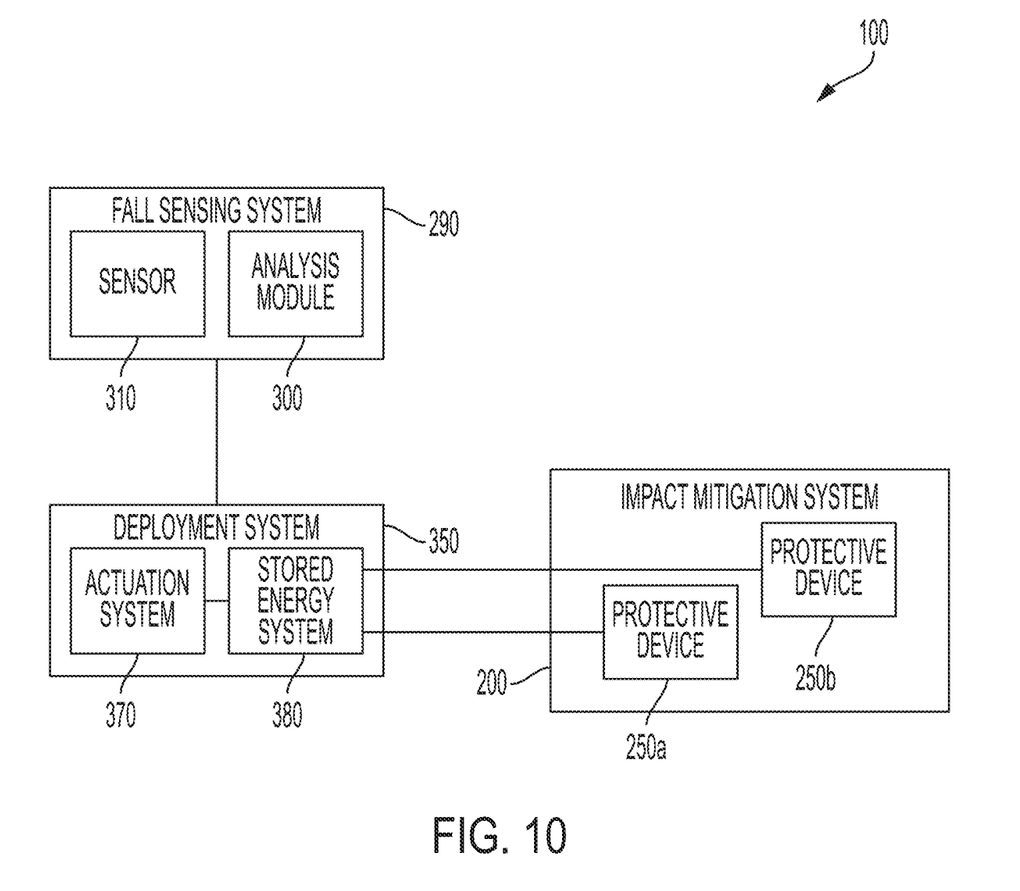
FIG. 10 is a schematic diagram showing components of an exemplary personal injury mitigation device.

An exemplary personal injury mitigation device 100 is shown in schematic form in the block diagram of FIG. 10, which is arranged for illustrative purposes to highlight logical functional components of the system. As will be noted from FIG. 10, the fall-sensing system 290 includes a sensor 310 and an analysis module 300. In the embodiments shown in FIGS. 1A-9B for illustrative purposes, the sensor 310 is shown as a discrete component separate from the analysis module 300 of the fall sensing system 290. By way of example, the sensor may be room-mounted. For example, the sensor be a pressure sensor, a proximity sensor, or a laser/lidar sensor. Alternatively, the sensor may be incorporated into the system 200, and may be, for example, a pressure sensor, a proximity sensor, or a laser/lidar sensor. By way of alternative example, the sensor may be a wearable sensor designed to be worn on the user/patient to be protected by the personal injury mitigation device, e.g., to monitor motion, position, orientation and/or acceleration of the sensor, and thus may include one or more accelerometers, gyroscopes, etc. In certain embodiments, more than one sensor may be employed in one or more locations. The analysis module receives data and/or a signal from the one or more sensor(s) reflecting sensed conditions, and performs an analysis to assess whether the patient is falling and/or whether a fall condition is present or likely. This may be performed in any suitable manner, and may be performed, for example, by a general purpose or special-purpose processor and appropriate software and/or dedicated circuitry for analyzing data/a signal from the sensor 310 and determining whether a fall condition is present/likely.

When the user falls, the sensor 310 gathers associated data and communicates corresponding data and/or a corresponding signal to the analysis module 300. If the analysis module determines that a fall condition is present/likely, e.g., by comparing sensor data to predefined thresholds, performing calculations, etc., then the fall sensing system, e.g., the analysis module 300 causes the deployment system 350 to operate. automatically release gas from the cartridge and inflate the airbag assembly.

As shown in FIG. 10, the fall sensing system 290 is in communication with the deployment system 350. In the event that the fall sensing system 290 determines that a fall condition is present/likely, the fall sensing system 290 communicates an associated signal to the deployment system 350. The associated signal acts as a trigger signal to cause deployment of one or more protective device(s) 250/250a/250b of the device 100. Accordingly, upon receipt of the trigger signal, a stored energy system 380 of the deployment system 350 is activated. By way of example, the stored energy system 380 may include a pressurized gas cylinder, and upon receipt of the trigger signal, an actuation system 370 of the deployment system 350 may open a valve to cause pressurized gas to from the pressurized gas cylinder 380 to one or more protective device(s) to deploy them. By way of alternative example, the stored energy system 380 may include a chemical compound or fuel, and upon receipt of the trigger signal, the actuation system 370 of the deployment system 350 may deliver electrical energy to ignite the fuel to create pressurized gas that will flow to one or more protective device(s), to deploy them. For example, an exemplary deployment system may include sodium azide ($NaN_3$) and potassium nitrate ($KNO_3$) that react very quickly to produce a large pulse of hot nitrogen gas for inflating/deploying the protective device(s). Any suitable stored energy system and deployment system mechanism may be used for this purpose.

The personal injury mitigation device 100 also includes an impact mitigation device 200. The impact mitigation device 200 includes one or more protective device(s) that are deployable as needed to create a cushion to protect a falling person. The protective device(s) may have any suitable form. By way of example, a protective device may have the form of an inflatable air bag. Notably, the protective device is configured to be stored in a compact form when not in use, e.g., with a suitable housing of the impact mitigation device 200. The housing may have any suitable form, as desired. For example, as shown in FIGS. 1A-9B, in certain embodiments, the housing may include hanger brackets for handing the impact mitigation device from convention structure of a toilet, such as the upper rim of a toilet tank, beneath a tank cover. By way of alternative example, the housing may include a mounting bracket include holes, fasteners or other structures for mounting the impact mitigation device to a wall of a bathroom. Alternatively, the housing may be designed and configured to be free-standing and self-supporting on the floor. In any event, any housing and the protective device(s) are designed in tandem, so that the protective device has a particular size and shape when deployed to provide the desired impact protection at the appropriate locations when the personal injury mitigation device is positioned in the bathroom (or other) environment as intended. As shown in the examples of FIGS. 1A-9B, the protective devices may having single or multiple compartments, and may be sized and shaped, for example, to extend along the front and/or sides of a toilet and/or along floor and/or wall surfaces, and/or to extend over sinks or other structures, from the respective intended mounting locations of the impact mitigation device 200, as desired.

As referred to above, FIG. 10 provides an example for illustrative purposes only, and is arranged for illustrative clarity to highlight logical functional components of the system. However, the logical components may be grouped into physical structures in any desired combination. For example, the analysis module 300 may be integrated into a common housing with the sensor 310. Alternatively, the sensor 310 may be discrete from the analysis module 300, and the analysis module 300 may be integrated into a common housing with the impact mitigation device 200 (as shown in FIGS. 1A-8B). By way of additional example, all or part of the deployment system 350 may be integrated into a common housing with the impact mitigation device 200. Any suitable configuration of these components may be used, as desired.

As discussed above, a personal injury mitigation device in accordance with the present invention may be used to protect persons from bodily injuries relating to falls, and may be desirable for use in hospitals, nursing homes, surgery centers, doctors' offices and other medical treatment/healthcare facilities where fall risks are elevated, particular in a bathroom environments. A device in accordance with the present invention may be used by first preparing the environment by introducing the device into the environment. This may be performed in various different fashions according to the construction of the device. For example, for free-standing devices, the device may be wheeled or carried into the environment and be positioned as desired (e.g., in front of a toilet). For permanently/semi-permanently-installed versions, such as toilet-mountable or wall-mountable devices, the sensors, bases and/or other components may be installed by fastening the devices to a wall, toilet, sink, etc. in accordance with each particular device's design and intended use, using suitable fasteners, mounting brackets/hangers/holes, etc. as appropriate. After the environment is prepared for use, a user may use the environment (e.g., use the bathroom) and be protected by the device. The sensor (worn on the patient, or mounted on the device or in the environment) will then monitor for a fall condition, as described above. In the event that the sensor provides a signal that is processed to determined that a fall condition is present, a trigger signal will be issued to cause release of stored energy and deployment of an impact-mitigating protective device, as described above. The device may be positioned strategically to cause the deployed protective device to be positioned so as to provide impact protection for objects within the environment likely to cause injury—e.g., a sink, the floor, wall portions, etc. If a person's falling body strikes the protective device, the (inflated/pressurized) protective device will provide impact protection mitigating or avoiding injury to the falling person, which is beneficial to both the patient and the healthcare/other facility.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A personal injury mitigation device comprising:
   a fall sensing system comprising:
      a sensor; and
      an analysis module configured to receive a signal from said sensor reflecting a physical state of said sensor, to process said signal to determine whether a fall condition is present, and to transmit a trigger signal if the fall condition is determined to be present;
   a deployment system operatively connected to said fall sensing system to receive the trigger signal, said deployment system comprising:
      a stored energy system; and
      an actuation system operatively connected to said stored energy system and operable to initiate release of energy from said stored energy system in response to receipt of the trigger signal from said fall sensing system; and
   an impact mitigation device operatively connected to the deployment system to receive released energy from the deployment system, the impact mitigation device comprising:
      a protective device operatively connected to said actuation system stored in a compact state, and being deployable from the compact state to a deployed state upon release of energy from said deployment system; and
      a housing specially-configured for a placement within an environment and storing said protective device in the compact state.

2. The personal injury mitigation device of claim 1, wherein said housing is specially configured for a particular placement within an environment.

3. The personal injury mitigation device of claim 2, wherein said protective device is at least one of dimensioned and shaped to provide impact protection for an object associated with the particular placement.

4. The personal injury mitigation device of claim 2, wherein said housing is configured to be puck-shaped.

5. The personal injury mitigation device of claim 2, wherein said housing is configured as a floor mat.

6. The personal injury mitigation device of claim 2, wherein said housing is configured as a pair of spaced housings.

7. The personal injury mitigation device of claim 2, wherein said housing is configured as a plurality of interconnected housings separated by a predetermined spacing for positioning said housings on opposite sides of a toilet.

8. The personal injury mitigation device of claim 7, wherein each respective housing stores a respective protective device, and wherein said protective devices have a matching size and shape.

9. The personal injury mitigation device of claim 7, wherein each respective housing stores a respective protective device, and wherein said protective devices are symmetrical.

10. The personal injury mitigation device of claim 7, wherein each respective housing stores a respective protective device, and wherein said protective devices are asymmetrical and complementary to one another in collectively extending to surround three sides of a toilet.

11. The personal injury mitigation device of claim 2, wherein said housing defines openings on a rear wall of the housing to facilitate mounting of said housing to a wall with fasteners passing through the openings.

12. The personal injury mitigation device of claim 2, wherein said housing is configured as a floor mat that is U-shaped and dimensioned to extend around three sides of a toilet.

13. The personal injury mitigation device of claim 2, wherein said protective device is shaped to provide impact protection for a floor area associated with particular placement adjacent a toilet, and wherein said protective device is rectangular in shape when in the expanded state.

14. The personal injury mitigation device of claim 2, wherein said protective device is shaped to provide impact protection for a floor area associated with particular placement adjacent a toilet, and wherein said protective device is U-shaped when in the expanded state.

15. The personal injury mitigation device of claim 2, wherein said impact mitigation device comprises a bracket dimensioned to hang said impact mitigation device from a rim of at least one of a toilet base and a toilet tank.

16. The personal injury mitigation device of claim 2, wherein said impact mitigation device comprises a flange defining mounting holes sized and spaced to correspond to holes in a toilet base provided for mounting a toilet seat to the toilet base.

17. The personal injury mitigation device of claim 2, wherein said housing has a rear surface complementary to a surface of a toilet base, said rear surface being provided with adhesive for mounting said housing to the surface.

18. The personal injury mitigation device of claim 2, wherein said housing comprises a plurality of housings, each respective housing storing a respective protective device, at least two of said respective protective devices being different in size and shape.

19. The personal injury mitigation device of claim 2, wherein said base is supported on a plurality of wheels.

20. The personal injury mitigation device of claim 19, said base further comprising a pedal operable to adjust the base from a first position in which said plurality of wheels are extended to engage the floor to reposition said base, to a second position in which said plurality of wheels are retracted and cannot engage the floor, to stabilize said base in a desired location within a room.

21. The personal injury mitigation device of claim 1, wherein said sensor is a mounted to said base.

22. The personal injury mitigation device of claim 1, wherein said sensor is a discrete component separate from said base to facilitate mounting of said sensor on a wall.

23. The personal injury mitigation device of claim 1, wherein said sensor comprises one of a pressure sensor, a proximity sensor, a laser radar sensor, and a lidar sensor.

24. The personal injury mitigation device of claim 1, wherein said sensor is configured to be worn by the person and is configured to monitor at least one motion, position, orientation and acceleration of said sensor.

25. The personal injury mitigation device of claim 1, wherein said analysis module is configured to process said signal to determine whether a fall condition is present by comparing sensor data to predefined threshold values.

26. The personal injury mitigation device of claim 1, wherein said actuation system is operable to initiate release of energy from said stored energy system by causing opening of a valve permitting pressurized gas to flow from a pressurized gas cylinder of said stored energy system.

27. The personal injury mitigation device of claim 1, wherein said actuation system is operable to initiate release of energy from said stored energy system by causing delivery of electrical energy sufficient to ignite stored fuel to cause resulting gas to flow from said stored energy system.

28. A personal injury mitigation device comprising:
   a fall sensing system comprising:
      a sensor; and
      an analysis module configured to receive a signal from said sensor reflecting a physical state of said sensor, to process said signal to determine whether a fall condition is present, and to transmit a trigger signal if the fall condition is determined to be present;
   a deployment system operatively connected to said fall sensing system to receive said trigger signal, said deployment system comprising:
      a stored energy system; and
      an actuation system operatively connected to said stored energy system and operable to initiate release of energy from said stored energy system in response to receipt of the trigger signal from said fall sensing system; and
   an impact mitigation device operatively connected to said deployment system to receive released energy from said deployment system, said impact mitigation device comprising:
      a plurality of housings;
      a plurality of protective devices, each of said protective devices having a size and shape corresponding to a respective impact point within a bathroom environment, at least one of said plurality of protective devices being stored in each of said plurality of housings in a compact state, each of said plurality of protective devices being operatively connected to said actuation system and being deployable from the compact state to a deployed state upon release of energy from said deployment system.

29. A personal injury mitigation device comprising:
   a fall sensing system comprising:
      a sensor selected from a group consisting of a pressure sensor, a proximity sensor, a laser radar sensor, and a lidar sensor; and
      an analysis module configured to receive a signal from said sensor reflecting a physical state of said sensor, to process said signal to determine whether a fall condition is present, and to transmit a trigger signal if the fall condition is determined to be present;
   a deployment system operatively connected to said fall sensing system to receive said trigger signal, said deployment system comprising:
      a stored energy system; and
      an actuation system operatively connected to said stored energy system and operable to initiate release of energy from said stored energy system in response to receipt of the trigger signal from said fall sensing system; and
   an impact mitigation device operatively connected to said deployment system to receive released energy from said deployment system, said impact mitigation device comprising:
      a housing;
      a protective device configured to be U-shaped when in a deployed state to provide impact protection for a floor area surrounding three sides of a toilet, said protective device being operatively connected to said actuation system and being deployable from a compact state to the deployed state upon release of energy from said deployment system.

* * * * *